United States Patent
Tanimoto et al.

(10) Patent No.: US 8,576,457 B2
(45) Date of Patent: Nov. 5, 2013

(54) IMAGE READING APPARATUS PROVIDED WITH A WHITE REFERENCE MEMBER FOR SHADING CORRECTION

(75) Inventors: Hiroshi Tanimoto, Toyokawa (JP); Akiyoshi Johdai, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 110 days.

(21) Appl. No.: 13/016,382

(22) Filed: Jan. 28, 2011

(65) Prior Publication Data

US 2011/0181922 A1 Jul. 28, 2011

(30) Foreign Application Priority Data

Jan. 28, 2010 (JP) ................................ 2010-16420

(51) Int. Cl.
*H04N 1/04* (2006.01)
(52) U.S. Cl.
USPC ........... 358/474; 358/448; 358/461; 358/505; 358/518
(58) Field of Classification Search
USPC .......................................... 358/474, 497–498
See application file for complete search history.

(56) References Cited

U.S. PATENT DOCUMENTS

2009/0302520 A1* 12/2009 Shimmachi et al. ........... 271/4.1

FOREIGN PATENT DOCUMENTS

| JP | 5-319613 | A | 12/1993 |
|----|----------|---|---------|
| JP | 7-273939 | A | 10/1995 |
| JP | 7-283902 | A | 10/1995 |
| JP | 8-337024 | A | 12/1996 |
| JP | 2002-51194 | A | 2/2002 |
| JP | 2004-165758 | A | 6/2004 |
| JP | 2009-290801 | A | 12/2009 |
| JP | 20092900801 | * | 12/2009 |

OTHER PUBLICATIONS

Office Action (Notification of Reason for Refusal) from Japanese Patent Office dated Dec. 23, 2011, issued in corresponding Japanese Patent Application No. 2010-016420, with English translation thereof.

* cited by examiner

*Primary Examiner* — Qian Yang
*Assistant Examiner* — Marcellus Augustin
(74) *Attorney, Agent, or Firm* — Buchanan Ingersoll & Rooney PC

(57) ABSTRACT

An image reading apparatus 4 includes an image reading portion 38 which is unmovably arranged at one side with respect to a document transportation path 30, a white reference member 43 for shading correction which is arranged at the other side with respect to the document transportation path 30, a cover member 50 which is capable of being opened and closed so as to expose or cover the document transportation path 30, and a driving unit 55 which changes a posture of the white reference member 43 between an operating posture at the time of the shading correction and a non-operating posture. The white reference member 43 is attached to the cover member 55. Further, the white reference member 43 and the driving unit 55 are related to each other such that the white reference member 43 is not made into the operating posture in conjunction with an opening operation of the cover member 55.

1 Claim, 14 Drawing Sheets

Fig. 4
(a)
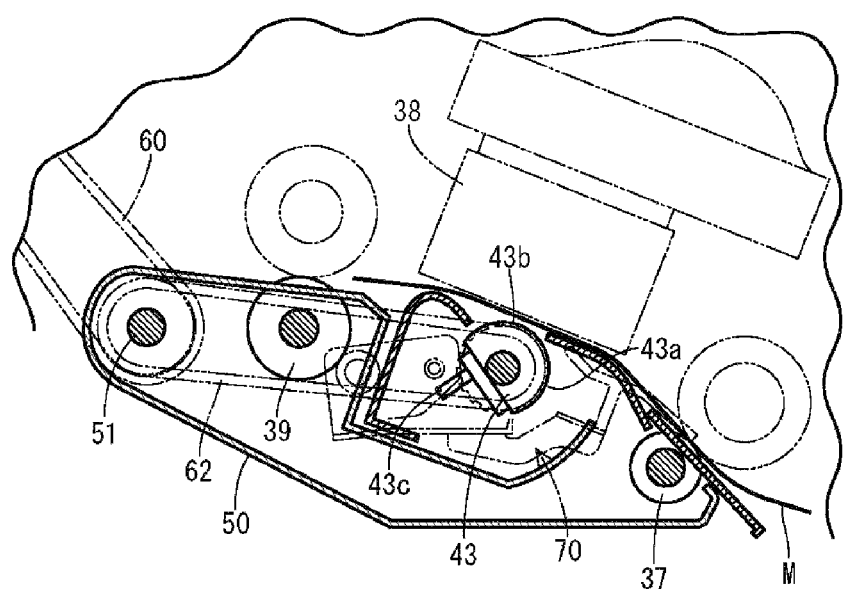
(b)
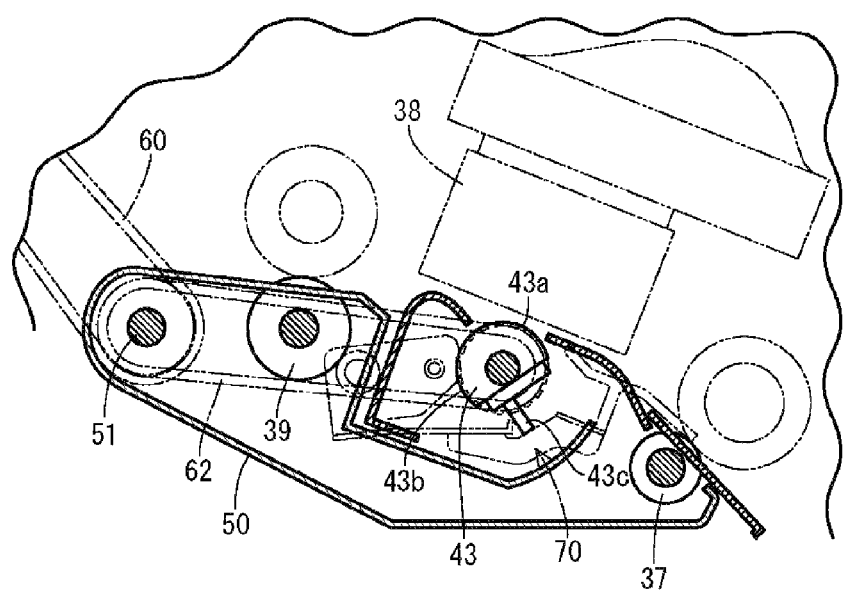

IMAGE READING APPARATUS PROVIDED WITH A WHITE REFERENCE MEMBER FOR SHADING CORRECTION

CROSS-REFERENCE TO RELATED APPLICATION

This application is based on application No. 2010-16420 filed in Japan, the entire content of which is hereby incorporated by reference.

BACKGROUND OF THE INVENTION

1. Field of the Invention

The present invention relates to a sheet through type image reading apparatus which reads an image on a document while being transported by an image reading portion which cannot be moved.

2. Related Art

Generally, in a sheet through type image reading apparatus, so-called shading correction is performed as follows. A white roller or a white plate is arranged at a position opposed to an image reading portion in a housing. Then, white color on a surface of the white roller or the white plate is read by the image reading portion so as to correct unevenness of brightness due to characteristics of an optical system and an imaging system such that an image having even brightness is obtained.

However, the surface of the white roller or the like is in contact with a document while being transported so as to be easily soiled. If the white roller or the like is soiled by the contact with the document, white color to be reference is disordered so that accuracy of the shading correction is deteriorated.

In terms of this point, in Japanese Unexamined Patent Publication Nos. 5-319613 and 2002-51194, the following configuration of an image reading apparatus is disclosed. In the image reading apparatus, a white reference portion is formed on an outer circumference of a reading roller opposed to an image reading portion. The white reference portion extends along a main scanning direction and has a shape so as not to be in contact with a document. Then, the white reference portion is read by the image reading portion so that shading correction is performed.

In the image reading apparatus as disclosed in Japanese Unexamined Patent Publication No. 5-319613, a bottom surface of a trench formed on the outer circumference of the reading roller is set to a white reference surface. Therefore, the white reference surface is prevented from making into contact with a document while being transported. On the other hand, in the image reading apparatus as disclosed in Japanese Unexamined Patent Publication No. 2002-51194, a part of the outer circumference of the reading roller is made to be a curved surface having a curvature radius which is larger than that of other parts (a curved surface of which curve is moderate). Then, the curved surface is set to a white reference surface. Therefore, the white reference surface is prevented from making into contact with a document while being transported.

The image reading apparatus of this type includes a guiding cover. The guiding cover can be opened and closed with respect to a housing so as to expose or cover a document transportation path in order to remove a document which gets jammed on the document transportation path between an image reading portion and a reading roller or clean a white reference portion of the reading roller, for example. Further, the reading roller is provided at an inner surface side (document transportation path side) of the guiding cover. A driving force is transmitted from a driving motor at the side of the housing to the reading roller at the side of the guiding cover through a belt or a gear transmission system. When the shading correction is performed, the driving motor is driven so as to rotationally drive the reading roller. Then, the white reference portion of the reading roller is opposed to the image reading portion so as to be read by the image reading portion.

However, in the conventional configuration, the driving motor at the side of the housing and the reading roller at the side of the guiding cover are connected through the belt or the gear transmission system such that a driving force can be transmitted therebetween. Therefore, when the guiding cover is opened for removing paper jam or cleaning the reading roller, even if the driving motor is not driven, the reading roller is rotated in accompanied with the opening operation so that the white reference portion is exposed to an inner surface side of the guiding cover in some case. In such a state, the white reference portion can be seen from the outside and a user or the like can contact with the white reference portion. Accordingly, if the white reference portion is carelessly soiled, a possibility of causing deterioration in the accuracy of the shading correction cannot be prevented.

SUMMARY OF THE INVENTION

A technical object of the present invention is to solve the above-described problem. The present inventors have studied repeatedly in order to improve the conventional techniques and have achieved the invention. The invention has multiphase applications.

An image reading apparatus according to a first aspect of the invention includes an image reading portion which is unmovably arranged at one side with respect to a document transportation path, a white reference member for shading correction which is arranged at the other side with respect to the document transportation path, a cover member which is capable of being opened and closed so as to expose or cover the document transportation path, and a driving unit which changes a posture of the white reference member between an operating posture at the time of the shading correction and a non-operating posture. In the image reading apparatus, the white reference member is attached to the cover member, and the white reference member and the driving unit are related to each other such that the white reference member is not made into the operating posture in conjunction with an opening operation of the cover member.

According to a second aspect of the invention, in the image reading apparatus according to the first aspect of the invention, it is preferable that the white reference member be a rotational roller which is long in a main scanning direction and have a white reference surface which extends in a belt form along the main scanning direction on an outer circumference of the rotational roller, when the rotational roller is in the operating posture, the rotational roller rotate with a driving force of the driving unit so as to expose the white reference surface to a side of the document transportation path of the cover member, and a locking unit which prevents the rotational roller from rotating to be made into the operating posture when the cover member is opened be provided.

According to a third aspect of the invention, in the image reading apparatus according to the second aspect of the invention, it is preferable that the locking unit have a ratchet claw which is elastically deformed so as to engage with and disengage from an engagement portion provided at one end of the rotational roller and the ratchet claw lock the engagement portion of the rotational roller with the opening operation of the cover member to prevent the rotational roller from rotating to be made into the operating posture.

According to a fourth aspect of the invention, in the image reading apparatus according to the first aspect of the invention, it is preferable that the driving unit have a transmission cutting member which blocks transmission of a driving force to the white reference member when the cover member is opened and the white reference member be made into a free state where a posture of the white reference member is not changed by the driving unit with an operation of the transmission cutting member.

According to a fifth aspect of the invention, in the image reading apparatus according to the fourth aspect of the invention, it is preferable that the transmission cutting member be a clutch member which blocks or continues transmission of a driving force to the white reference member in conjunction with opening and closing operations of the cover member.

According to a sixth aspect of the invention, in the image reading apparatus according to the fourth aspect of the invention, it is preferable that the transmission cutting member be a gear member of which engagement is released with the opening operation of the cover member.

According to a seventh aspect of the invention, in the image reading apparatus according to the first aspect of the invention, it is preferable that the white reference member be not made into the operating posture in conjunction with the opening operation of the cover member by providing the driving unit at the side of the cover member.

BRIEF DESCRIPTION OF DRAWINGS

FIG. 4A is a schematic side cross-sectional view illustrating a state where a sheet feeding surface of a rotational roller is exposed. FIG. 4B is a schematic side cross-sectional view illustrating a state where a white reference surface of the rotational roller is exposed.

DESCRIPTION OF THE PREFERRED EMBODIMENTS

Hereinafter, an embodiment in which the invention is embodied will be described with reference to drawings. An image reading apparatus 4 according to an embodiment is mounted on a Multi Function Printer (hereinafter, referred to as MFP) 1 as an example of an image forming apparatus.

1. Outline of Image Forming Apparatus

Figure 1:
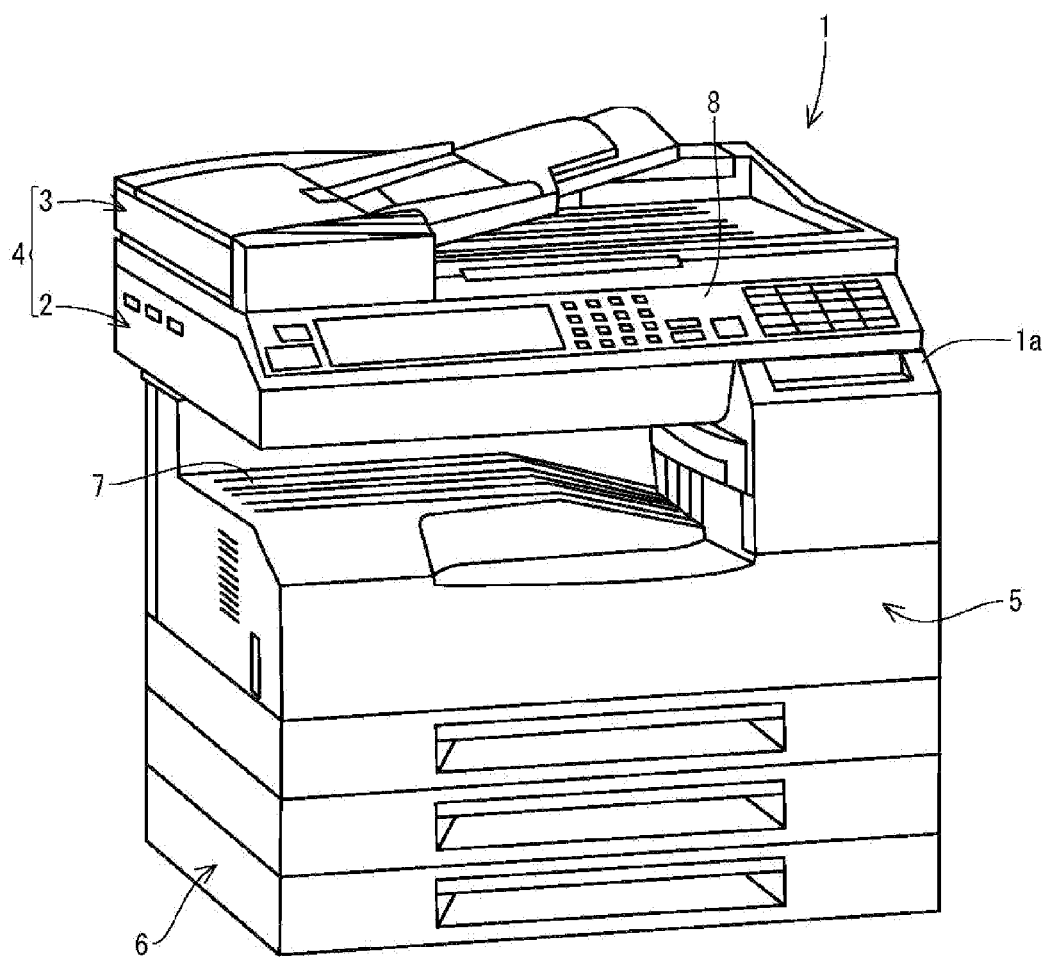
FIG. 1 is an external perspective view illustrating an image forming apparatus having an image reading function.

The MFP 1 as shown in FIG. 1 has multiple functions including a copying function, a scanner function, a printer function, and a facsimile function. The MFP 1 can transmit and receive data through a network (communication network) such as a LAN or a telephone network. That is to say, the MFP 1 can output image data read from a document to another computer through a network, input image data from another computer through a network, execute printing based on the image data, or receive facsimile data.

The image reading apparatus 4 which includes a scanner portion 2 and an automatic document feeder 3 (hereinafter, referred to as ADF) is provided on an upper portion of an apparatus main body 1a of the MFP 1. The image reading apparatus 4 is configured as follows. The scanner portion 2 and the ADF 3 are operated in synchronization with each other so as to optically read an image from each document set on the ADF 3. With this operations, image data is acquired. That is to say, the image reading apparatus 4 is configured such that the ADF 3 transports documents one by one toward the scanner portion 2 and the scanner portion 2 reads an image when a document passes through a predetermined reading position so that image data is acquired.

A sheet feeding portion 6 which accommodates recording materials is provided at a lower portion of the apparatus main body 1a. An image forming portion 5 is provided between the image reading apparatus 4 and the sheet feeding portion 6 of the apparatus main body 1a. The image forming portion 5 prints a toner image onto the recording material. The sheet feeding portion 6 supplies the recording materials one by one to the image forming portion 5. The image forming portion 5 prints a toner image onto the recording material based on the image data acquired by the image reading apparatus 4 or through a network. A concaved space between the image reading apparatus 4 and the image forming portion 5 on the apparatus main body 1a corresponds to a discharged sheet storing portion 7. The recording material onto which a toner image has been printed by the image forming portion 5 is discharged to the discharged sheet storing portion 7.

An operation panel 8 is provided on a front side (anterior surface side) of the apparatus main body 1a. The operation panel 8 has a plurality of keys (buttons). A user operates the keys while checking a display screen or the like on the operation panel 8 so as to perform setting about a function selected from various functions of the MFP 1 or instruct the MFP 1 to execute operations.

2. Configuration of Image Reading Apparatus

Next, a configuration of the image reading apparatus 4 is described with reference mainly to FIG. 2. The ADF 3 includes a sheet feeding tray 31 on which a plurality of documents M are placed (set). The documents M placed on the sheet feeding tray 31 are fed one by one starting from an uppermost document to a document transportation path 30 by a pick up roller 32 and a sheet feeding roller pair 33. Then, the document M is transported to a resist roller pair 35 through an intermediate roller pair 34. The resist roller pair 35 adjusts one document M transported to be in a predetermined posture and transports the document M toward a first transportation roller pair 36 at a predetermined timing. Then, the document M is transported onto a slit glass 21 of the scanner portion 2 by the first transportation roller pair 36. The slit glass 21 is formed into a small-width long plate form which is long in a main scanning direction perpendicular to a document transportation direction and is transparent.

When the document M passes through the position on the slit glass 21, a first document reading unit 22 reads an image on a downward-facing first face (surface) on the document M. The first document reading unit 22 is positioned at a lower side of the slit glass 21. A second transportation roller pair 37, a second document reading unit 38, a third transportation roller pair 39, and a sheet discharge roller 40 are arranged on the document transportation path 30 at the transportation downstream side with respect to the position on the slit glass 21. The second document reading unit 38 corresponds to an image reading portion as described in Claims. The document M which has passed through the position on the slit glass 21 is fed to a position just under the second document reading unit 38 by the second transportation roller pair 37. Then, the second document reading unit 38 reads an image on an upward-facing second face (back surface) of the document M while the document M is passing through the position. The document M which has passed through the position just under the second document reading unit 38 is discharged on a sheet discharge tray 41 by the third transportation roller pair 39 and the sheet discharge roller 40. The sheet discharge tray 41 is positioned at a lower side of the sheet feeding tray 31.

Figure 2:
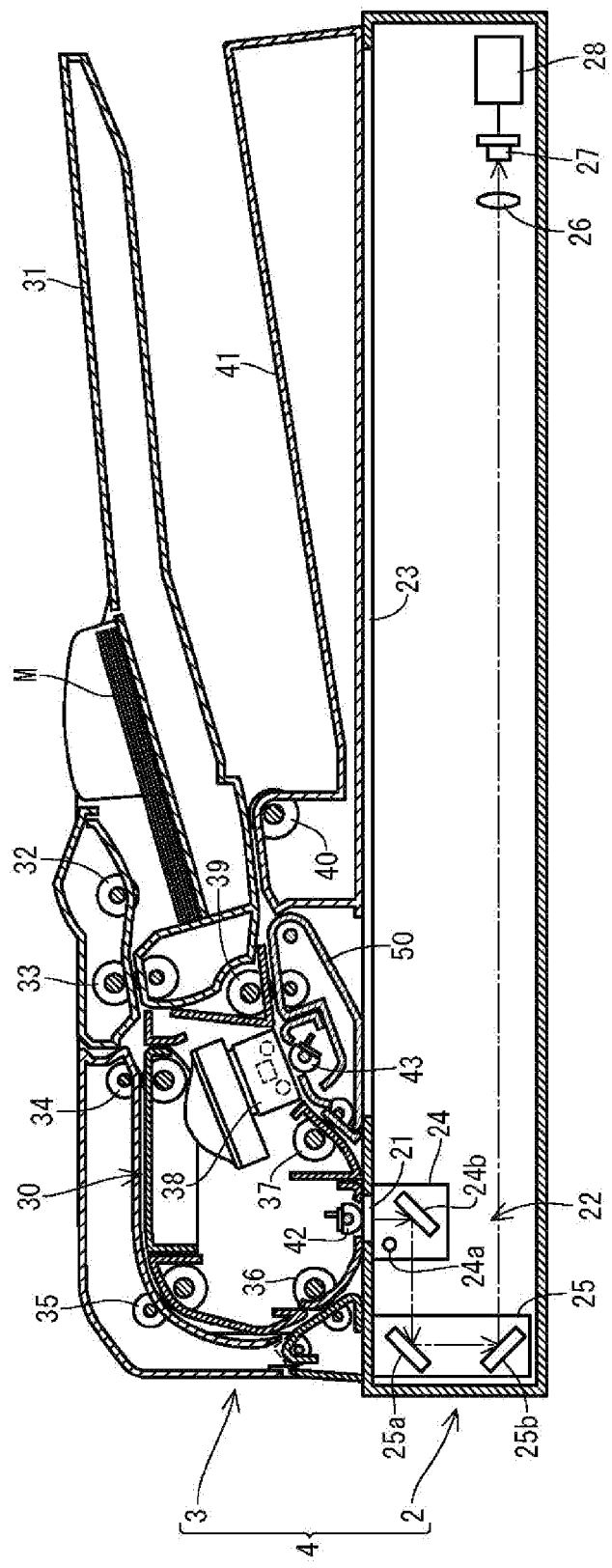
FIG. 2 is a schematic side cross-sectional view illustrating an internal configuration of an image reading apparatus.

As is obvious from FIG. 2, the document transportation path 30 in the ADF 3 is a path from the sheet feeding tray 31 to the sheet discharge tray 41 through the pickup roller 32, the sheet feeding roller pair 33, the intermediate roller pair 34, the resist roller pair 35, the first transportation roller pair 36, the position on the slit glass 21, the second transportation roller pair 37, the position just under the second document reading unit 38, the third transportation roller pair 39, and the sheet discharge roller 40. Further, the document transportation path 30 is a path formed into a substantially U-shaped form (curved form) when viewed from the side.

A rotatable cleaning roller 42 is provided at an upper side of the slit glass 21. The cleaning roller 42 rotationally drives in a state where there is no document M on the slit glass 21 so as to remove foreign matters such as paper powder adhered onto the slit glass 21. For example, when a plurality of documents M are continuously transported in the ADF 3, the cleaning roller 42 rotationally drives in a time interval since a previous document M has passed through the position on the slit glass 21 until a subsequent document M reaches to the position so as to clean the slit glass 21. A rotational roller 43 is rotatably provided at a side opposite to the second document reading unit 38 with respect to the document transportation path 30. The rotational roller 43 is an example of a white reference member for shading correction.

On the other hand, the above-described slit glass 21 and a platen glass 23 are provided on an upper surface of the scanner portion 2. The platen glass 23 is formed into a flat plate form having a large width and is transparent. The above-described first document reading unit 22 is provided in the scanner portion 2. The first document reading unit 22 reads an image on the first face of a document M which passes through the position on the slit glass 21 and an image on a document M placed on the platen glass 23. Further, the first document reading unit 22 includes a scanning unit 24, a driving unit 25, an image forming lens 26, and a first line sensor 27. The scanning unit 24 has a light source 24a and a reflection mirror 24b. The driving unit 25 has a pair of reflection mirrors 25a, 25b.

When a document M passes through the position on the slit glass 21, light is irradiated toward a first face of the document M from the light source 24a in a state where the scanning unit 24 and the driving unit 25 are fixed. Then, the reflection light from the first face of the document M is introduced to the first line sensor 27 through the reflection mirror 24b, both of the reflection mirrors 25a, 25b, and the image forming lens 26 so that an image is formed. Further, when an image on the document M placed on the platen glass 23 is read, light is irradiated toward a lower surface (facing surface) of the document M from the light surface 24a while the scanning unit 24 and the driving unit 25 move in the sub scanning direction. Then, the reflection light thereof is introduced to the first line sensor 27 so that an image is formed. The first line sensor 27 is formed with a Charge Coupled Device (CCD) having a plurality of photoelectric conversion elements which are arranged along the main scanning direction. The first line sensor 27 converts the formed optical image to an image signal and outputs the image signal to an image processor 28. In the image processor 28, the input image signal is subjected to an analog processing, an A/D conversion, a shading correction, an image compressive processing, and the like so as to generate a digitalized image data. Then, the digitalized image data is output to the image forming portion 5.

Figure 3:
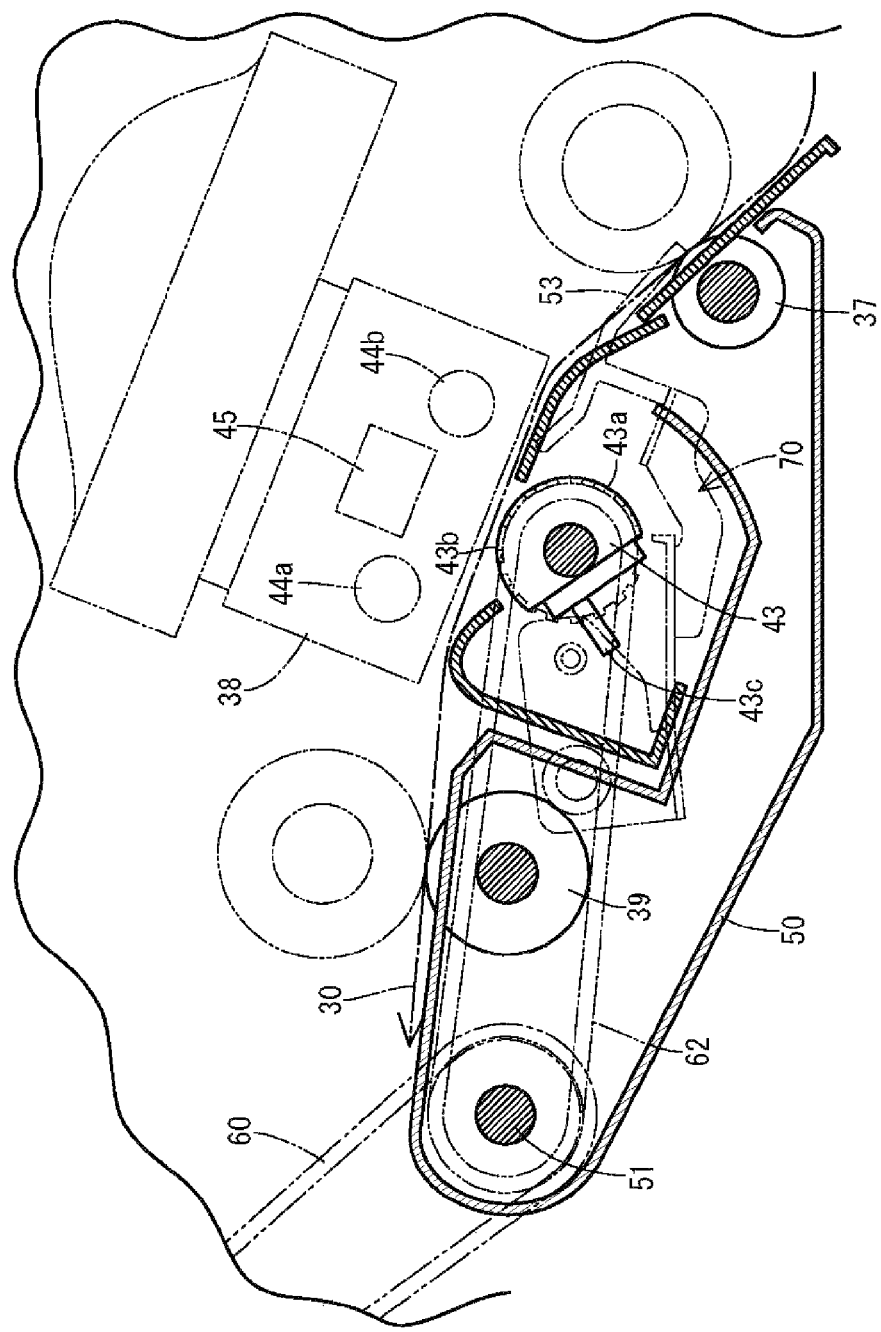
FIG. 3 is a schematic side cross-sectional view illustrating a cover member according to a first embodiment.

The second document reading unit 38 arranged in the ADF 3 in an unmovable manner reads an image on the second face of the document M which passes through a position on the rotational roller 43. The second document reading unit 38 includes a pair of light sources 44a, 44b and a second line sensor 45 (see, FIG. 3). When a document M passes through the position on the rotational roller 43, light is irradiated toward the second face of the document M from both of the light sources 44a, 44b. Then, the reflection lights thereof are received by the second line sensor 45 so that an image is formed. The second line sensor 45 is formed with a Contact Image Sensor (CIS) having a plurality of photoelectric conversion elements which are arranged along the main scanning direction. The second line sensor 45 also converts the formed optical image to an image signal and outputs the image signal to the image processor 28 in the same manner as the first line sensor 27.

A cover member 50 facing the second document reading unit 38 is provided at a bottom side of the ADF 3. The cover member 50 can be opened and closed rotationally about a supporting point 51 provided at a transportation downstream side (right side in FIG. 2 and left side in FIG. 3). An inner surface of the cover member 50 at the side of the document transportation path 30 functions as a guiding surface constituting a part of the document transportation path 30 in a state where the cover member 50 is closed. On the cover member 50, one of the second transportation rollers 37, the rotational roller 43, and one of the third transportation rollers 39 are rotatably assembled in parallel with each other so as to be unitized. Opening trenches (not shown) corresponding to each of the rollers 37, 43, 39 are formed on the inner surface of the cover member 50 at the side of the document transportation path 30. A part of an outer circumference of each of the rollers 37, 43, 39 is exposed from each of the opening trenches. With the opening/closing rotation of the cover member 50, a range from the second transportation roller pair 37 to the third transportation roller pair 39 on the document transportation path 30 is exposed or covered.

Figure 5:
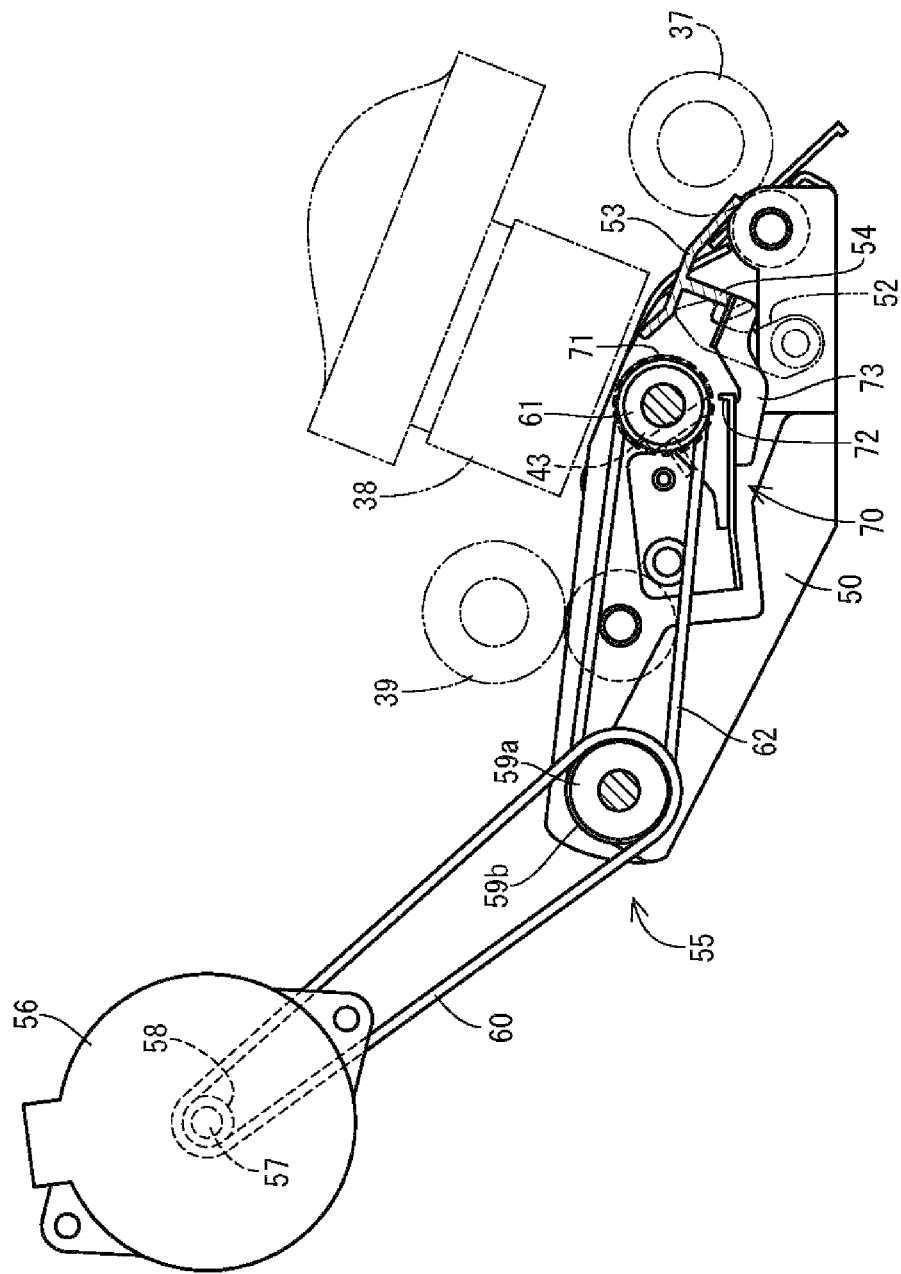
FIG. 5 is a side descriptive view illustrating a relationship between the cover member in a closed state and a driving unit.
Figure 6:
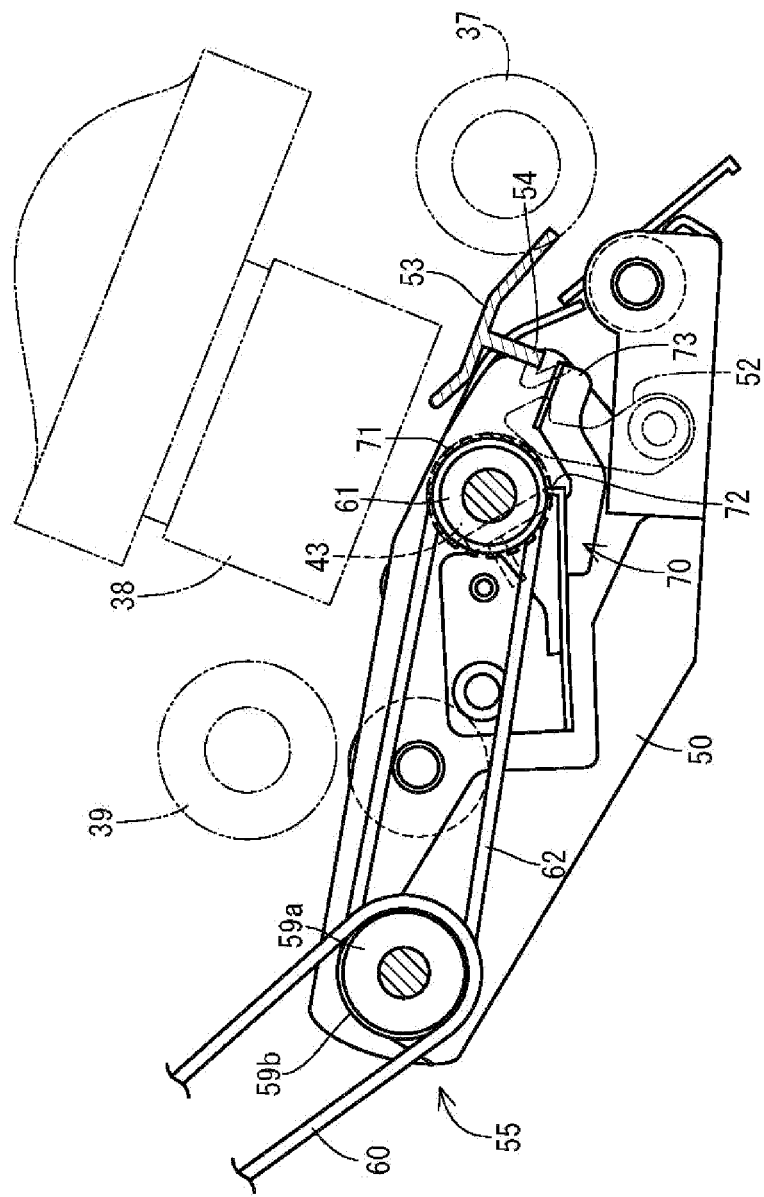
FIG. 6 is a side descriptive view illustrating a relationship between the cover member in a latch-released state and the driving unit.
Figure 7:
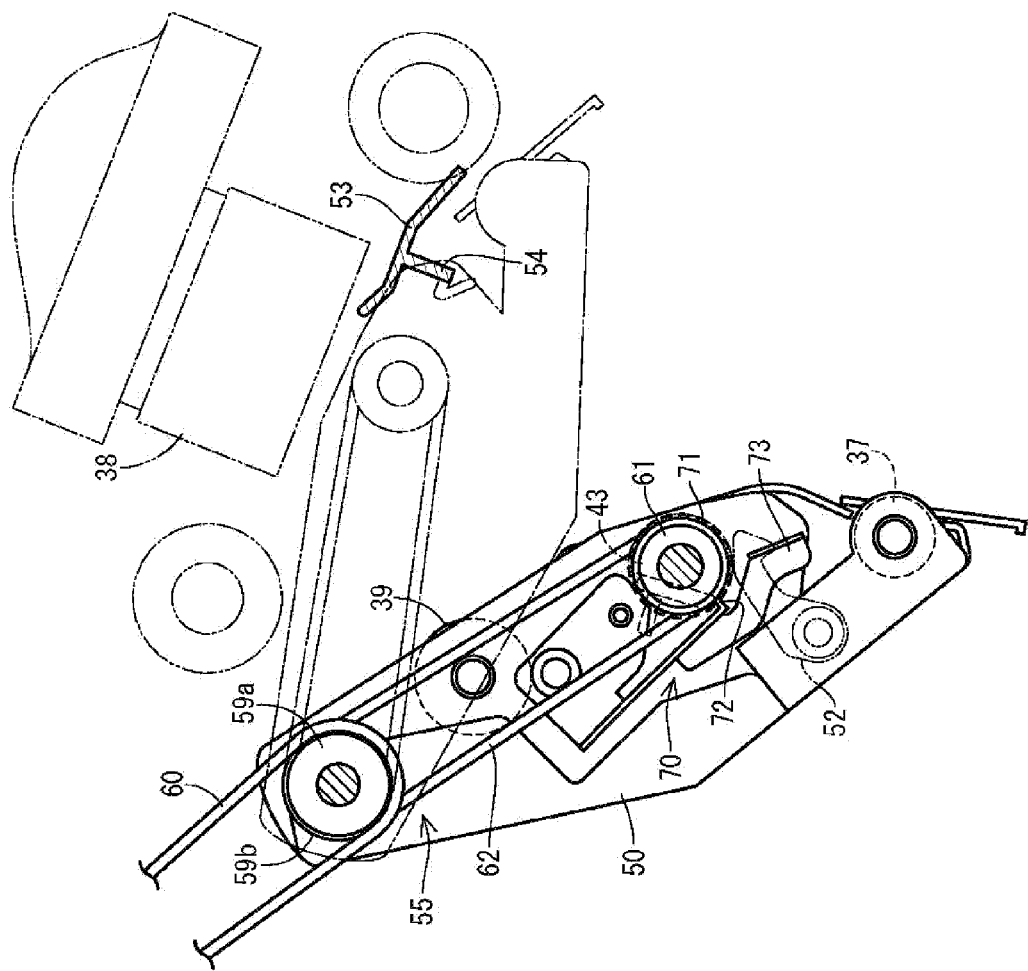
FIG. 7 is a side descriptive view illustrating a relationship between the cover member in an opened state and the driving unit.

A latch claw 52 which engages with and disengages from a latch reception fragment 53 is provided at each of side plate portions of the cover member 50 in the main scanning direction (only one latch claw 52 and one latch reception fragment 53 are shown in FIG. 5 to FIG. 7). The latch reception fragment 53 is provided at the side of the ADF 3. The cover member 50 is made into an opened rotatable state (can be shifted into an opened state) or is made into a closed state by engaging or disengaging the latch claws 52 with respect to the latch reception fragments 53 by operating an opening and closing gripper (not shown) provided on the cover member 50.

The rotational roller 43 as an example of a white reference member is extended in the main scanning direction and is pivotally supported in a rotatable manner by the cover member 50. An outer circumferential portion of the rotational roller 43 is formed with a curved surface (roller surface) and a flat surface. As shown in FIGS. 4A and 4B, the curved surface is divided into a white reference surface 43a for shading correction and a sheet feeding surface 43b. The white reference surface 43a is extended in a belt form along the main scanning direction. The sheet feeding surface 43b is in contact with a document M so as to guide the document M when the document M is transported. On the other hand, a cleaning brush 43c made of a large number of brush hairs is implanted on the flat surface.

The rotational roller 43 is normally in a non-operating posture in which the sheet feeding surface 43b of the rotational roller 43 is exposed from an opening trench of the cover member 50 (see, FIG. 4A). For example, when a document M passes through the position just under the second document reading unit 38, the sheet feeding surface 43b is in contact with the document M so as to guide the document M. Further, when shading correction is performed before the document M passes through the position just under the second document reading unit 38, the rotational roller 43 rotationally drives so as to be in an operating posture in which the white reference surface 43a is exposed from the opening trench of the cover member 50 (see, FIG. 4B). That is to say, the rotational roller 43 is configured such that the posture thereof is changed between the operating posture in which the white reference surface 43a is exposed from the cover member 50 (is opposed to the second document reading unit 38) at the time of the shading correction and the non-operating posture in which the white reference surface 43a is hidden in the cover member 50.

It is to be noted that the cleaning brush 43c provided on the flat surface is configured to be made into contact with the second document reading unit 38 appropriately by the rotational driving of the rotational roller 43 in a state where the document M is not present at a position just under the second document reading unit 38. Foreign matters such as paper powder adhered to the second document reading unit 38 are swept by the cleaning brush 43c so as to be removed.

As shown in FIG. 5 to FIG. 7 in detail, a driving unit 55 is connected to one end of a shaft portion of the rotational roller 43 such that a driving force can be transmitted to the rotational roller 43. The driving unit 55 is a member for changing a posture of the rotational roller 43 (for rotationally drives the rotational roller 43). The driving unit 55 includes a driving motor 56 which is arranged in the ADF 3. A motor output shaft 57 of the driving motor 56 can rotate in forward and reverse directions. An output pulley 58 is firmly attached to the motor output shaft 57. A first relay pulley 59a and a second relay pulley 59b are pivotally supported at one end of the supporting point 51 of the cover member 50 in a rotatable manner. Both of the relay pulleys 59a, 59b are configured so as to rotate integrally. An upstream transmission belt 60 for transmitting a driving force is wound over the output pulley 58 at the side of the driving motor 56 and the first relay pulley 59a. A downstream transmission belt 62 wound over the second relay pulley 59b is wound over an input pulley 61. The input pulley 61 is firmly attached to one end of the shaft portion of the rotational roller 43. A rotational driving force of the driving motor 56 is transmitted to the rotational roller 43 through both of the transmission belts 60, 62. With this, the sheet feeding surface 43b of the rotational roller 43 is exposed from the cover member 50, the white reference surface 43a is exposed from the cover member 50, or the cleaning blush 43c is made into contact with the second document reading unit 38.

3. First Embodiment of Exposure Prevention Configuration

Next, a first embodiment (first embodiment of the invention) of a configuration by which unintended exposure of the white reference surface 43a in accompanied with the opening operation of the cover member 50 is prevented is described with reference to FIG. 5 to FIG. 7. A following risk is present if the driving motor 56 at the side of the ADF 3 and the rotational roller 43 at the side of the cover member 50 are connected to each other with both of the transmission belt 60, 62 such that a driving force can be transmitted from the driving motor 56 to the rotational roller 43, as described above. That is, in the configuration, when the cover member 50 is opened, the rotational roller 43 may become in an operating posture in which the white reference surface 43a is exposed from the cover member 50. This is caused when the downstream transmission belt 62 is moved around due to a configuration relationship between both the relay pulleys 59a, 59b at the supporting point 51 of the cover member 50. In consideration of this point, the rotational roller 43 and the driving unit 55 are related to each other such that the rotational roller 43 is not made into the operating posture in conjunction with the opening operation of the cover member 50 in the embodiment.

In the first embodiment as shown in FIG. 5 to FIG. 7, a locking unit 70 is provided. The locking unit 70 prevents the rotational roller 43 from rotating to be made into the operating posture when the cover member 50 is opened. The locking unit 70 includes ratchet teeth 71 which are provided at an outer circumference of the input pulley 61 and serves as engagement portions and a ratchet claw 72 which is elastically deformed so as to engage with or disengage from the ratchet teeth 71. The ratchet claw 72 locks the ratchet teeth 71 with the opening operation of the cover member 50 and prevents the rotational roller 43 from rotating to be made into the operating posture (keeps the rotational roller 43 so as not to be rotated and prevents the white reference surface 43a from being exposed).

The ratchet teeth 71 are formed on the outer circumference of the input pulley 61 with intervals along the circumferential direction. The ratchet claw 72 is made of a material which can be elastically deformed, and is arranged on the input pulley 61 of the cover member 50 at the downstream side. Further, the ratchet claw 72 is urged in the direction that the ratchet claw 72 engages with the ratchet teeth 71 from the lower side with its own elastic restoring force all the time.

A release arm 73 is integrally provided on the ratchet claw 72. The release arm 73 abuts against an abutment portion 54, which formed on the latch reception fragment 53 at the side of the ADF 3, in a pressure manner when the cover member 50 is closed. When the cover member 50 is closed (see, FIG. 5), the release arm 73 abuts against the abutment portion 54 of the latch reception fragment 53 in a pressure manner and the ratchet claw 72 is elastically deformed in a direction away from the ratchet teeth 71 against the elastic restoring force. Therefore, the input pulley 61 and eventually the rotational roller 43 can be rotated with a rotational driving force transmitted from the driving motor 56.

As shown in FIG. 6 and FIG. 7, when the cover member 50 is opened, the release arm 73 at the side of the cover member 50 is separated from the abutment portion 54 of the latch reception fragment 53 at the side of the ADF 3. As a result, the ratchet claw 72 engages with the ratchet teeth 71. The rotational roller 43 is normally in the non-operating posture in which the sheet feeding surface 43*b* is exposed from the cover member 50. Therefore, the rotational roller 43 is kept so as not to rotate in the non-operating posture (in a state where the sheet feeding surface 43*b* is exposed from the cover member 50) with the locking operation of the ratchet claw 72.

With the above configuration, the rotational roller 43 and the driving unit 55 are related to each other such that the rotational roller 43 is not made into the operating posture in conjunction with the opening operation of the cover member 50. Therefore, a risk that a user or the like contacts with the rotational roller 43 in the operating posture when the cover member 50 is opened is reduced in comparison with the conventional technique. As a result, a possibility that the rotational roller 43 in the operating posture is soiled in a state where the cover member 50 is opened is reduced. Therefore, an effect that the shading correction accuracy can be easily kept to be in an excellent state for a long period of time can be obtained.

In particular, in the first embodiment, the locking unit 70 which prevents the rotational roller 43 from rotating to be made into the operating posture when the cover member 50 is opened is provided. Therefore, when the cover member 50 is opened, a posture stability of the rotational roller 43 in the non-operating posture is high. That is to say, when the cover member 50 is opened, even if a user or the like contacts with the rotational roller 43, the rotational roller 43 can be kept to be in the non-operating posture with the operation of the locking unit 70. Accordingly, a risk that a user or the like contacts with the rotational roller 43 in the operating posture can be substantially eliminated.

Further, the locking unit 70 has a ratchet claw 72 which can engage with and disengage from the ratchet teeth 71 as engagement portions provided on one end of the rotational roller 43. The ratchet claw 72 locks the ratchet teeth 71 of the rotational roller 43 by the opening operation of the cover member 50 so as to prevent the rotational roller 43 from rotating to be made into the operating posture (the rotational roller 43 is kept so as not to rotate and the white reference surface 43*a* is prevented from being exposed). Therefore, the ratchet teeth 71 can be smoothly locked by the ratchet claw 72 by using the elastic deformation only by opening the cover member 50. This makes it possible to prevent the rotational roller 43 from rotating to be made into the opening posture without any trouble with a simple configuration.

Figure 8:
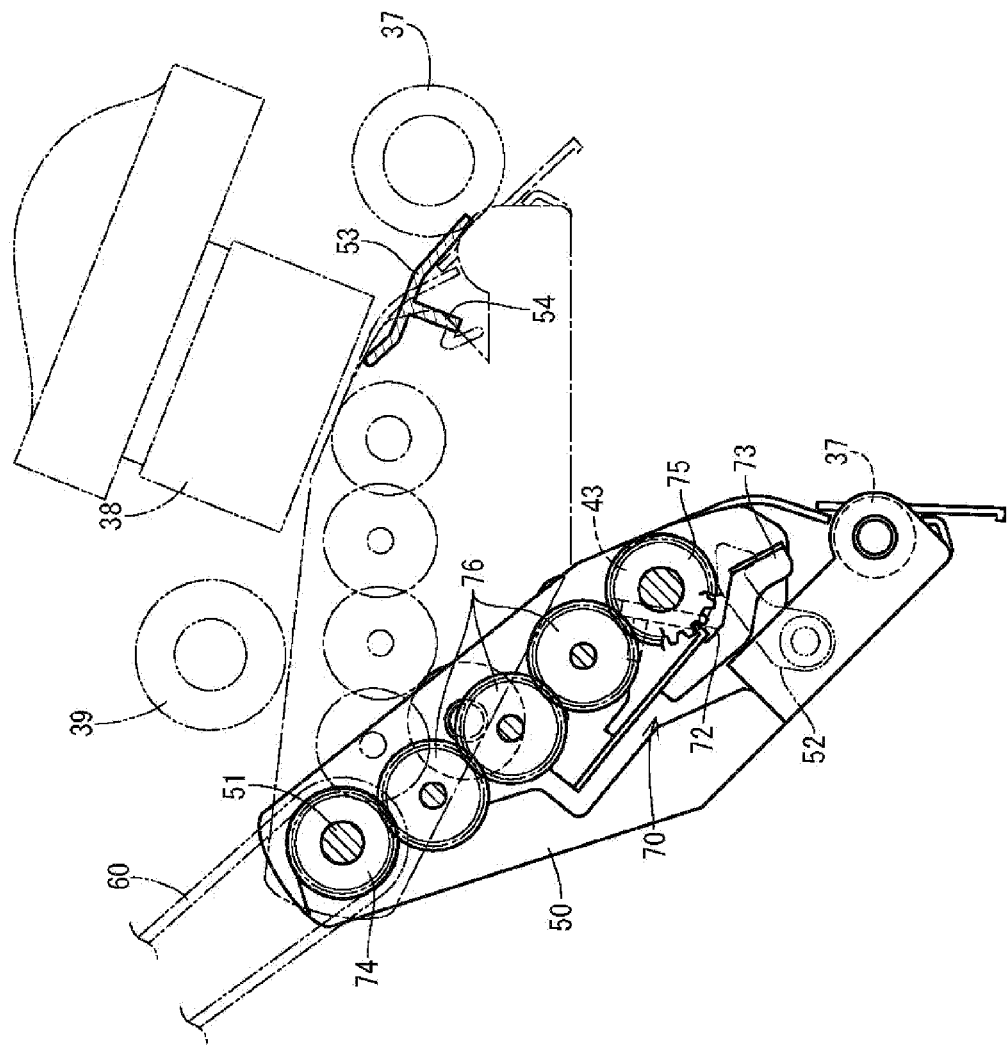
FIG. 8 is a side descriptive view illustrating another example of the first embodiment.

Note that in the driving unit 55, a configuration in which the second relay pulley 59*b* at the side of the supporting point 51 and the input pulley 61 at the side of the rotational roller 43 are connected to each other such that a driving force can be transmitted is not limited to the above-described downstream transmission belt 62 (belt transmission configuration). For example, as shown in FIG. 8, a gear transmission configuration in which both the pulleys 59*b*, 61 are replaced by gears 74, 75 and a relay gear group 76 is arranged between the gears 74, 75 may be employed. In this case, it is needless to say that the gear 75 itself replacing the input pulley 61 functions as the above-described ratchet teeth 71. Further, the gear 74 replacing the second relay pulley 59*b* is connected to the first relay pulley 59*a* so as to integrally rotate.

4. Second Embodiment of Exposure Prevention Configuration

Figure 9:
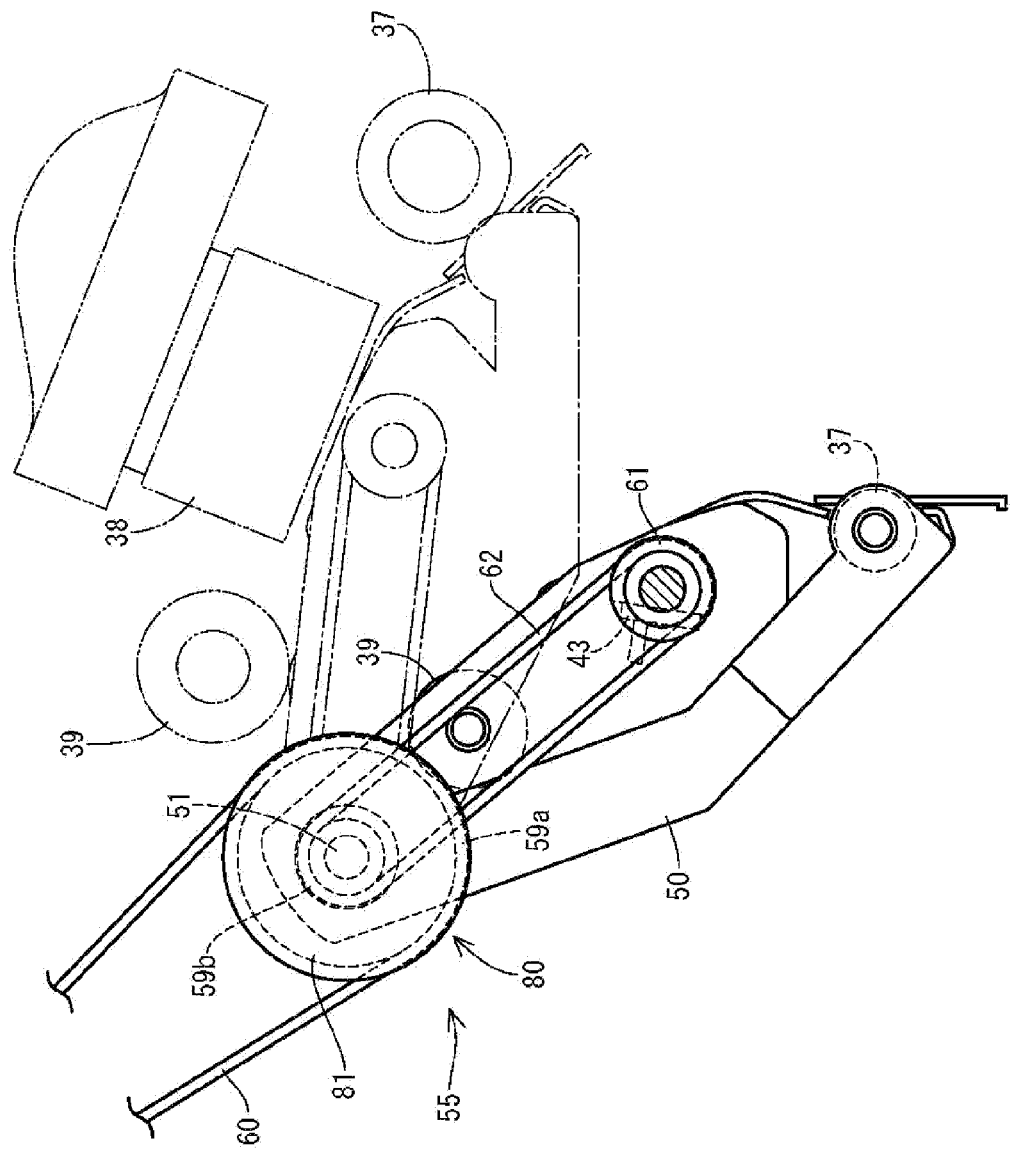
FIG. 9 is a schematic side view illustrating a cover member according to a second embodiment.
Figure 10:
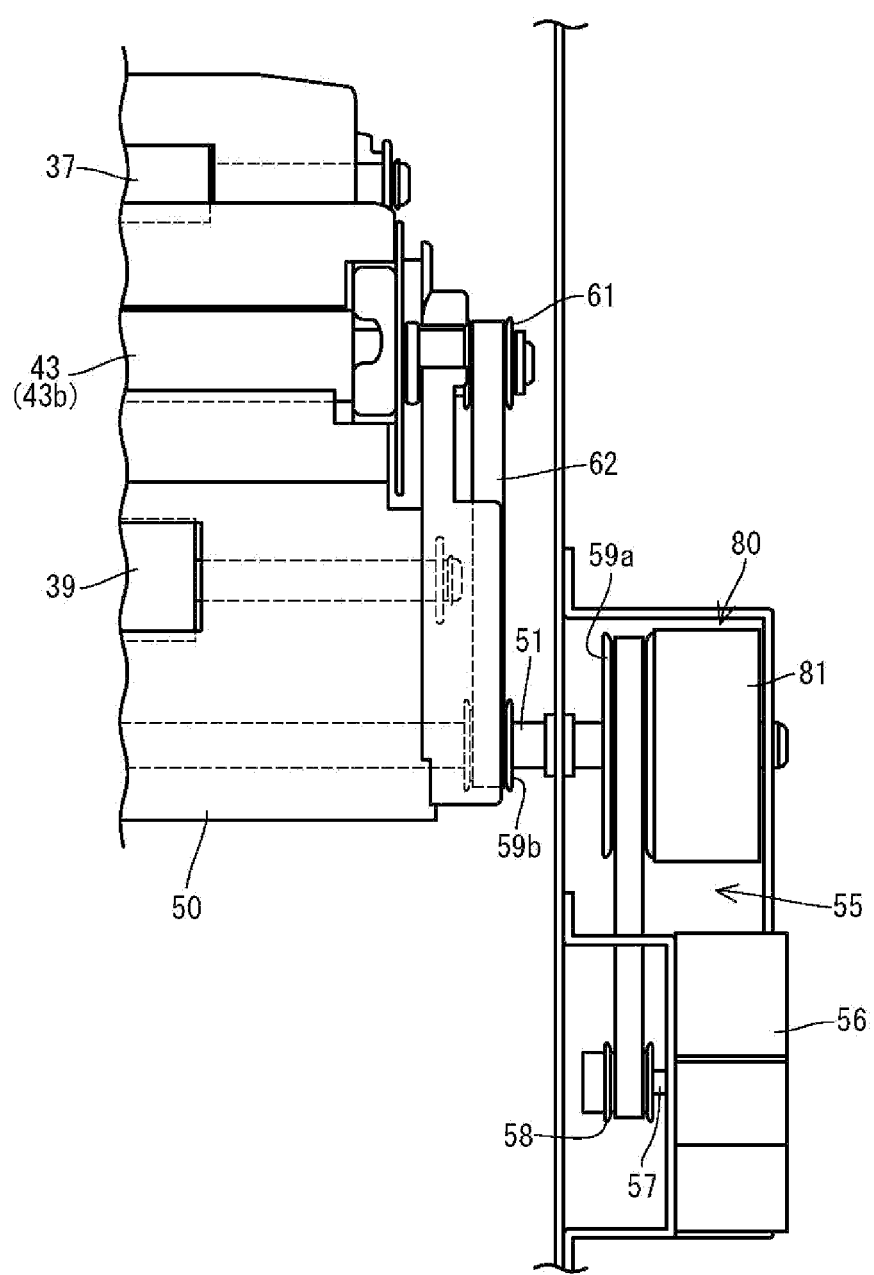
FIG. 10 is a partial plan view illustrating a relationship between the cover member and the driving unit.

FIG. 9 and FIG. 10 illustrate a second embodiment of the invention. In the second embodiment, the driving unit 55 for transmitting a driving force from the driving motor 56 to the rotational roller 43 has a transmission cutting member 80. The transmission cutting member 80 blocks transmission of the driving force to the rotational roller 43 from the driving motor 56 when the cover member 50 is opened. If the transmission cutting member 80 is operated, the rotational roller 43 is made into a free state where the posture of the rotational roller 43 is not changed by the driving unit 55. This point is different from the first embodiment. Other configurations in the second embodiment is almost the same as those in the first embodiment.

In this case, a clutch member 81 as an example of the transmission cutting member 80 is provided on the supporting point 51 of the cover member 50. The clutch member 81 blocks or continues the transmission of the driving force to the rotational roller 43 in conjunction with the opening and closing operations of the cover member 50. The clutch member 81 is formed with an electromagnetic clutch. In a state where the cover member 50 is closed and the driving motor 56 is driven, the clutch member 81 is turned ON and the first relay pulley 59*a* and the second relay pulley 59*b* are connected to each other so as to integrally rotate. Therefore, a rotational driving force from the driving motor 56 is transmitted to the rotational roller 43 through both of the transmission belts 60, 62.

In a state where the cover member 50 is opened, since the driving motor 56 is not driven, the clutch member 81 is in an OFF state. Then, the first relay pulley 59*a* and eventually, the second relay pulley 59*b* are made into a free state in which the pulleys are idly rotatable. Then, a force of rotating the rotational roller 43 to be in the operating posture in conjunction with the opening operation of the cover member 50 is absorbed (cancelled out) by the second relay pulley 59*b* in the free state. Therefore, the rotational roller 43 is kept to be in the non-operating posture in which the sheet feeding surface 43*b* is exposed from the cover member 50 unless a user or the like carelessly contacts with the rotational roller 43.

Accordingly, in the second embodiment, a risk that a user or the like contacts with the rotational roller 43 in the operating posture when the cover member 50 is opened is also reduced in comparison with the conventional technique. Therefore, as in the first embodiment, the rotational roller 43 in the operating posture is not easily soiled. Therefore, an effect that the shading correction accuracy can be kept to be in an excellent state for a long period of time can be obtained. It is to be noted that the clutch member 81 may be incorporated in the cover member 50.

5. Third Embodiment of Exposure Prevention Configuration

Figure 11:
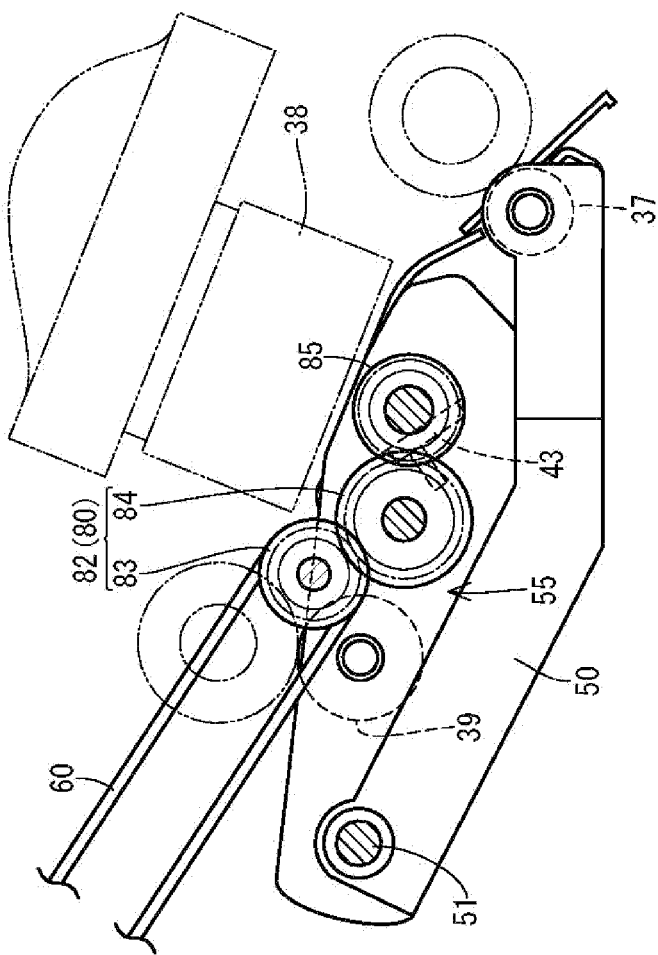
FIG. 11 is a side descriptive view illustrating a relationship between the cover member in the closed state and the driving unit in a third embodiment.
Figure 12:
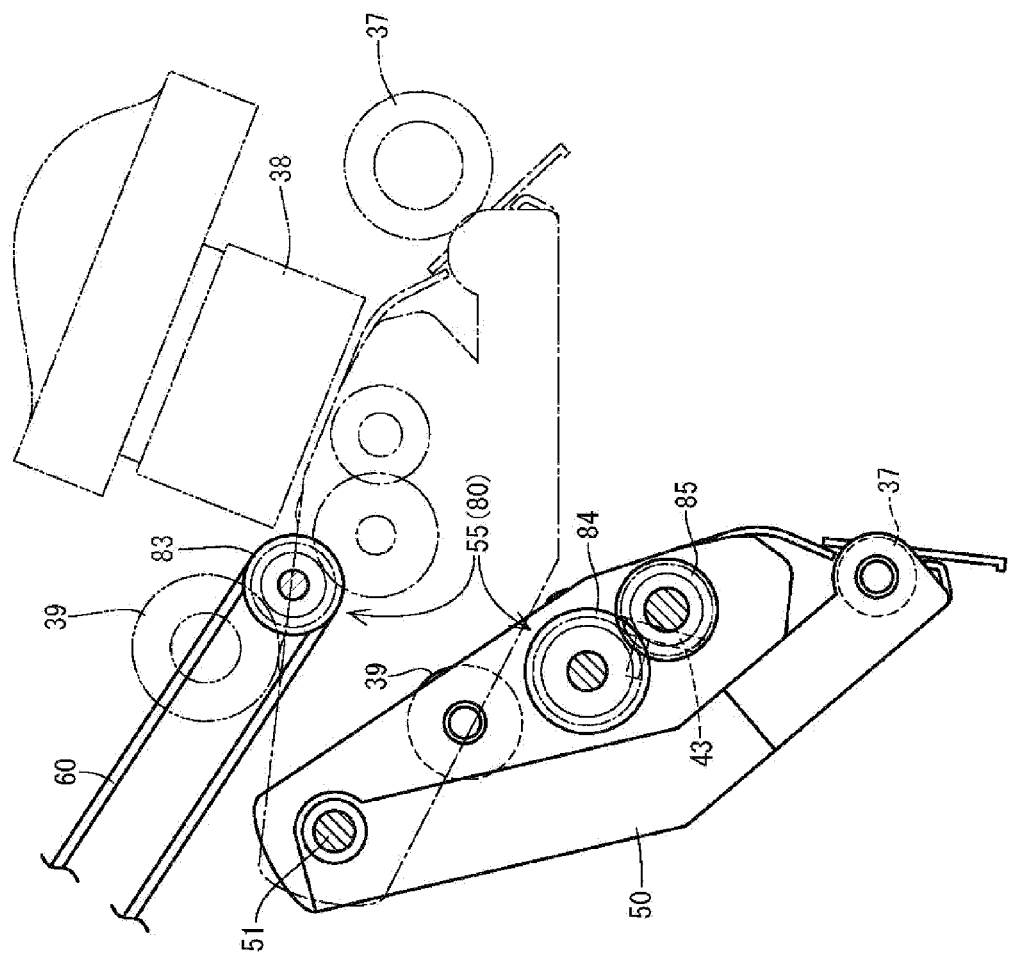
FIG. 12 is a side descriptive view illustrating a relationship between the cover member in the opened state and the driving unit.

FIG. 11 and FIG. 12 illustrate a third embodiment of the invention. In the third embodiment, as another example of the transmission cutting member 80, a gear member 82 is employed. When the cover member 50 is opened, engagement of the gear member 82 is released. In this case, the first and second relay pulleys 59*a*, 59*b* are not provided on the supporting point 51 of the cover member 50 and an upstream coupling gear 83 is provided at an inner side of the ADF 3. The upstream coupling gear 83 can rotate about a shaft line parallel with the motor output shaft 57. The upstream coupling gear 83 has a pulley over which the upstream transmission belt 60 is wound and a rotational driving force from the driving motor 56 (rotation of the motor output shaft 57) is transmitted to the upstream coupling gear 83 through the upstream transmission belt.

A downstream coupling gear 84 which engages with the upstream coupling gear 83 in a state where the cover member 50 is closed is pivotally supported by one side plate portion of the cover member 50 in the main scanning direction in a rotatable manner. Further, an input gear 85 is firmly attached to one end of the shaft portion of the rotational roller 43 in place of the input pulley 61. The downstream coupling gear 84 engages with the input gear 85 all the time regardless of the opening and closing states of the cover member 50. The upstream coupling gear 83 and the downstream coupling gear 84 constitute the gear member 82.

In a state where the cover member 50 is opened, the engagement between the upstream coupling gear 83 and the downstream coupling gear 84 is released so that the downstream coupling gear 84 is made into the free state in which the downstream coupling gear 84 is idly rotatable. In this case, a force of rotating the rotational roller 43 to be in the operating posture in conjunction with the opening operation of the cover member 50 does not act (is not present) because the coupling gears 83, 84 are separated from each other. Therefore, the rotational roller 43 can be kept to be in the non-operating posture in which the sheet feeding surface 43b is exposed from the cover member 50 unless a user or the like carelessly contacts with the rotational roller 43.

Accordingly, in the third embodiment, a risk that a user or the like contacts with the rotational roller 43 in the operating posture when the cover member 50 is opened is also reduced in comparison with the conventional technique. Therefore, as in the first and second embodiments, the rotational roller 43 in the operating posture is not easily soiled. Therefore, an effect that the shading correction accuracy can be kept to be in an excellent state for a long period of time can be obtained.

6. Fourth Embodiment of Exposure Prevention Configuration

Figure 13:
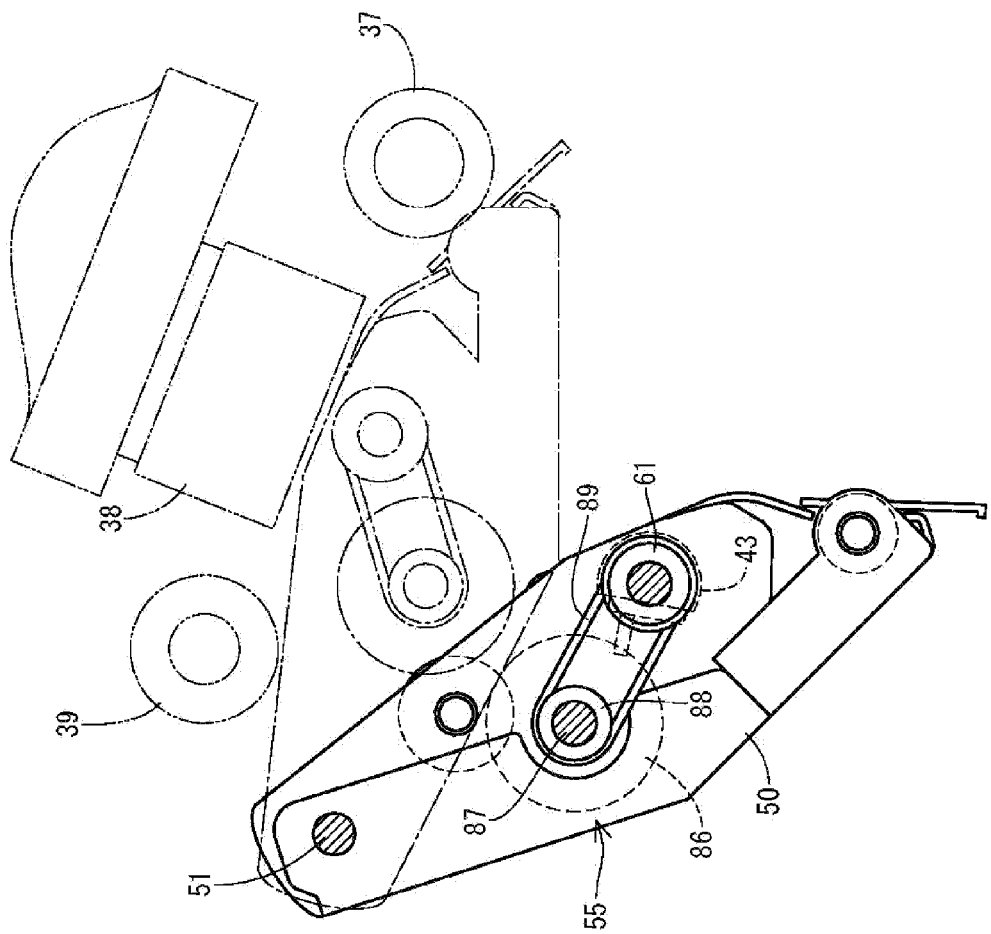
FIG. 13 is a schematic side view illustrating a cover member according to a fourth embodiment.
Figure 14:
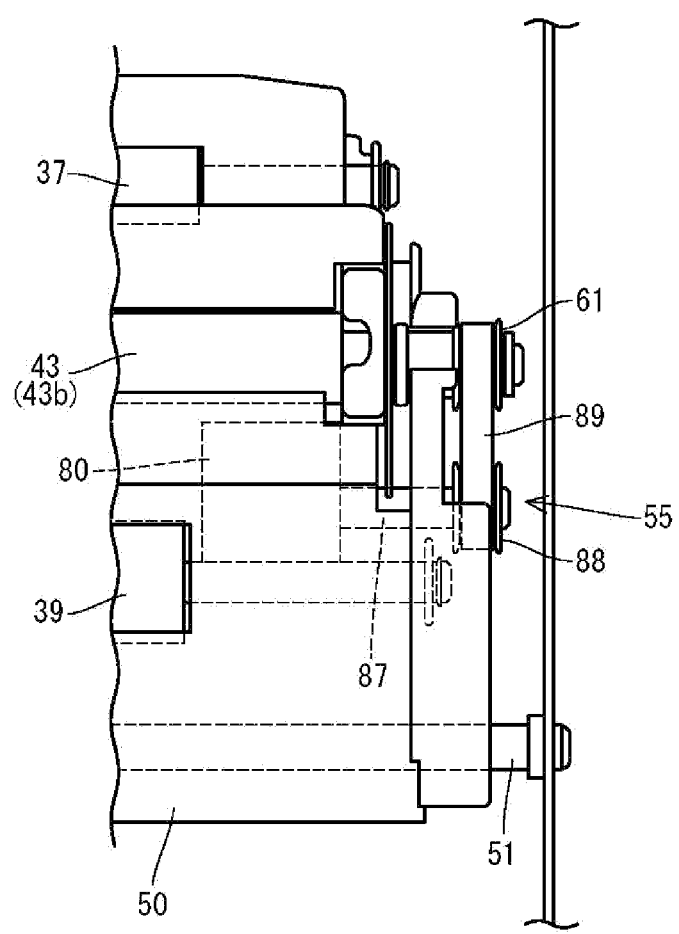
FIG. 14 is a partial plan view illustrating a relationship between the cover member and the driving unit.

FIG. 13 and FIG. 14 illustrate a fourth embodiment of the invention. In the fourth embodiment, the driving unit 55 for transmitting a driving force to the rotational roller 43 from a driving motor 86 is provided on the cover member 50. With this, the rotational roller 43 is not made into the operating posture in conjunction with the opening operation of the cover member 50. This point is different from the first embodiment. Other configurations in the forth embodiment is almost the same as those in the first embodiment.

In the fourth embodiment, the driving motor 86 as a constituent component of the driving unit 55 is provided in the cover member 50. A motor output shaft 87 which can rotate in forward and reverse directions on the driving motor 86 projects outward from one side plate (side plate at which the input pulley 61 is formed) of the cover member 50 in the main scanning direction. An output pulley 88 is firmly attached to the projecting end of the motor output shaft 87. A transmission belt 89 is wound over the output pulley 88 at the side of the driving motor 86 and the input pulley which is firmly attached to one end of the shaft portion of the rotational roller 43.

In this case, the entire driving unit 55 is present at the side of the cover member 50 and is not connected to the side of the ADF 3. Therefore, a force of rotating the rotational roller 43 to be in the operating posture in conjunction with the opening operation of the cover member 50 does not act (is not present). Therefore, the rotational roller 43 is kept to be in the non-operating posture in which the sheet feeding surface 43b is exposed from the cover member 50 unless a user or the like carelessly contacts with the rotational roller 43.

Accordingly, in the fourth embodiment, a risk that a user or the like contacts with the rotational roller 43 in the operating posture when the cover member 50 is opened is also reduced in comparison with the conventional technique. Therefore, as in the first to third embodiments, the rotational roller 43 in the operating posture is not easily soiled. Therefore, an effect that the shading correction accuracy can be kept to be in an excellent state for a long period of time can be obtained.

7. Others

Some embodiments relating to the invention have been described above but, the invention is not limited to the above description. For example, in the above embodiments, a case where the image forming apparatus MFP 1 is an apparatus having a multiple functions including a copying function, a facsimile function, a printer function, and a scanner function is described. However, the image forming apparatus MFP 1 is not required to have all the plurality of functions. In particular, the image reading apparatus 4 can be applied to an apparatus including at least one function of the copying function, the facsimile function, and the scanner function. The white reference member is not limited to the rotational roller 43 and a movable white reference plate can be employed. Moreover, a configuration of each part is not limited to the embodiment shown in the drawings and can be variously modified in a range without departing from a scope of the invention.

What is claimed is:

1. An image reading apparatus comprising:
an image reading portion which is unmovably arranged at one side with respect to a document transportation path;
a white reference member for shading correction which is arranged at the other side with respect to the document transportation path, the white reference member having a white reference surface for shading correction and a sheet feeding surface;
a cover member which is capable of being opened and closed so as to expose or cover the document transportation path, wherein the white reference member is attached to the cover member; and
a driving unit which changes a posture of the white reference member between an operating posture at the time of the shading correction in which the white reference surface is opposed to the image reading portion and a non-operating posture at the time of a document transportation in which the sheet feeding surface is opposed to the image reading portion, wherein the driving unit has a transmission cutting member that is a gear member of which engagement is released with an opening operation of the cover member, and blocks transmission of a driving force to the white reference member when the cover member is opened and the white reference member is placed into a free state where a posture of the white reference member is not changed by the driving unit with an operation of the transmission cutting member, and
the white reference member and the driving unit are related to each other such that when the white reference member is in the non-operating posture before the opening operation of the cover member, the white reference member remains in the non-operating posture irrespective of the opening operation of the cover member.

* * * * *